United States Patent Office 2,746,997
Patented May 22, 1956

2,746,997
PRODUCTION OF CYCLOHEXENE FLUOROCARBONS

Thomas S. Reid, New Canada Township, Ramsey County, George H. Smith, St. Paul, and Wilbur H. Pearlson, White Bear Township, Ramsey County, Minn., assignors to Minnesota Mining & Manufacturing Company, St. Paul, Minn., a corporation of Delaware No Drawing. Application July 27, 1951,
Serial No. 239,022

2 Claims. (Cl. 260—648)

This invention relates to our discovery of a novel process for the production of cyclohexene fluorocarbons. These are fully fluorinated cyclic olefins having a single double bond in a 6-carbon ring.

More particularly, our invention relates to the production of perfluoro-cyclohexene, c–$C_6F_{10}$, and perfluoro-methylcyclohexenes having one or more trifluoromethyl substituents bonded to the ring.

These unsaturated cyclic fluorocarbons are reactive and polymerizable. They have value as chemical intermediates and as monomers which can be polymerized and co-polymerized. They undergo addition reactions. They can be oxidized, for example by basic aqueous permanganate solutions, to form dibasic fluoro carbon acids. Thus perfluoro-adipic acid, $(CF_2)_4(COOH)_2$, can be made from perfluoro-cyclohexene.

We have discovered that these perfluoro-cyclohexenes can be made in a very simple and direct way, and in substantially quantitative yields, by pyrolysis of perfluoro-cyclohexyl and perfluoro-methylcyclohexyl carboxylic acids. In these acids a carboxyl group (—COOH) is directly bonded to a carbon atom of a saturated perfluoro-cyclohexyl ring. This ring can also have one or more trifluoromethyl groups bonded to carbon atoms of the ring and they will be retained in the product compound, but the ring must have at least one fluorine atom on a carbon atom adjacent to the carboxyl-bearing carbon atom, that is, it must have at least one beta fluorine atom.

The carboxyl group and a beta fluorine atom are split off and an adjacent double bond is formed in the ring. Thus:

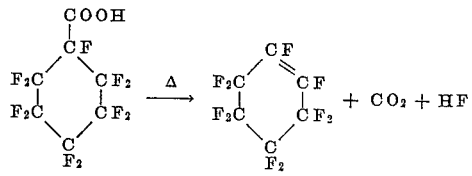

The above starting compound, perfluoro-cyclohexyl carboxylic acid, c–$C_6F_{11}COOH$, has a boiling point of about 172° C. (at 740 mm.), and the fluorocarbon product, perfluoro-cyclohexene, c–$C_6F_{10}$, has a boiling point of about 52° C. (at 740 mm.).

The starting acid is passed in vapor phase through a tube heated to a temperature of the general order of 550° C., the tube being of sufficient length relative to the flow rate to permit of substantially complete conversion. It is unnecessary to employ a catalyst. The reactor tube can be a simple unpacked carbon-lined tube. The $CO_2$ and HF products, and any unreacted starting acid, being water-soluble and acidic, can be easily separated out from the water-insoluble and normally liquid fluorocarbon product. The latter can be further purified by fractional distillation.

Examples of starting acids for making perfluoromethyl-cyclohexenes, having one or more trifluoromethyl groups bonded to the ring, are the fully fluorinated (perfluoro) 2-methylcyclohexyl carboxylic acid, 3-methylcyclohexyl carboxylic acid, 4-methylcyclohexyl carboxylic acid, 2,4-dimethylcyclohexyl carboxylic acid, and 2,2,6-trimethyl-cyclohexyl carboxylic acid. These acids belong to the family of fully fluorinated (perfluoro) naphthenic acids.

It should be noted that the present reaction is not a "decarboxylation" reaction in the sense commonly meant by that term, viz.:

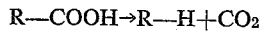

The perfluoro-cyclohexyl carboxylic acids can be made from the corresponding hydrocarbon acids by electrolysis of a solution thereof in anhydrous liquid hydrogen fluoride, using a steel-cathode nickel-anode cell operated at about 0° C., the applied cell voltage being about 5 to 6 volts. The starting acid is converted to the corresponding fully fluorinated acid fluoride ($R_fCOF$, where $R_f$ is the fluorocarbon radical), which settles to the bottom of the cell together with fluorocarbon byproducts. The cell drainings are mixed with the theoretical amount of water required for hydrolysis of the perfluoro acid fluoride, thereby converting the latter to the perfluoro acid, which is then recovered by fractional distillation.

This electrochemical fluorination procedure causes fluorine addition to unsaturated starting compounds. Hence aromatic carboxylic acids can be employed as starting compounds for preparing the perfluoro saturated cyclohexyl carboxylic acids employed in the present process. Thus benzoic acid, $C_6H_5COOH$, can be fluorinated to produce c–$C_6F_{11}COF$, which can be hydrolyzed to perfluoro-cyclohexyl carboxylic acid, c–$C_6F_{11}COOH$. Similarly, ortho-toluic acid, o–$CH_3C_6H_4COOH$, can be used for making perfluoro 2-methylcyclohexyl carboxylic acid, 2–$CF_3C_6F_{10}COOH$; meta-toluic acid can be used for making perfluoro 3-methylcyclohexyl carboxylic acid

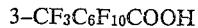

and para-toluic acid can be used for making perfluoro 4-methylcyclohexyl carboxylic acid 4–$CF_3C_6F_{10}COOH$.

The above-mentioned electrochemical process is broadly described in the patent of J. H. Simons, No. 2,519,983, issued on August 22, 1950. The making of fluorocarbon acids by the electrochemical process is specifically described in the copending application of A. H. Diesslin, E. A. Kauck and J. H. Simons, S. N. 70,154, filed January 10, 1949, since issued as Patent No. 2,593,011 on September 4, 1951, and in the divisional application since issued as Patent No. 2,593,737 on April 22, 1952, which claims the c–$C_6F_{11}COOH$ acid.

The perfluoro-cyclohexyl carboxylic acids employed in the present process differ markedly in their behavior from the non-cyclic perfluoro-alkyl carboxylic acids. The former, unlike the latter, can be converted by pyrolysis in almost quantitative yields to the fluorocarbon olefins even in the absence of a catalyst. Thus we have discovered that these cyclic acids provide excellent starting compounds for making perfluoro-cyclohexenes by a simple procedure which does not result in a substantial degree of ring cleavage and which substantially fully converts the starting acid to the cyclic olefin.

Example

The reactor consisted of an unpacked carbon-lined steel tube, having an internal diameter of ¾ inch, located in an electric furnace, the length of the tube inside the furnace being 13 inches. The temperature was measured by a furnace thermocouple located outside the tube. Seventy grams of vaporized perfluorocyclohexyl carboxylic acid, c–$C_6F_{11}COOH$, was passed through the heated tube over a period of two hours, the temperature being 550° C. The exit gas mixture was passed through a sodium fluoride tube to remove HF, and then through a series of three condensing traps cooled successively by ice (0° C.), by a mixture of acetone and solid-$CO_2$ (−80° C.), and by liquid air (−180° C.). The condensates of the first two traps were combined and the material boiling below room temperature allowed to volatilize. The remaining material was fractionated through a helix-packed laboratory distillation column, yielding 60 grams of colorless water-insoluble liquid product boiling at 51–52° C. (at 740 mm.), which was identified as relatively pure perfluoro-cyclohexene, $c$-$C_6F_{10}$. It had an infrared absorption maximum at 1742 cm.$^{-1}$. The yield was close to 100%. No detectable amount of $c$-$C_6F_{11}H$ was found. The identification was corroborated by analysis and by study of the reaction properties.

An especially pure "heart cut" had a refractive index of 1.289 and a density of 1.665 (both taken at 25° C.), and a boiling point of 52.0–52.5° C. (at 740 mm.).

What we claim is as follows:

1. The process which comprises pyrolyzing a fully fluorinated cyclic carboxylic acid of the class consisting of perfluoro-cyclohexyl carboxylic acid ($c$-$C_6F_{11}COOH$) and perfluoro-methylcyclohexyl carboxylic acids having at least one ring-bonded trifluoromethyl group and having at least one beta fluorine atom, by heating the acid in vapor phase at a temperature of about 550° C., so as to cause a high-yield conversion to a cyclic olefinic fluorocarbon compound having a single double bond in a 6-carbon ring, and recovering the latter.

2. A process of making perfluoro-cyclohexene ($c$-$C_6F_{10}$)

which comprises passing perfluoro-cyclohexyl carboxylic acid ($c$-$C_6F_{11}COOH$) in vapor phase through a heated tube maintained at a temperature of about 550° C. so as to cause substantially complete conversion to perfluoro-cyclohexene, and recovering the latter.

References Cited in the file of this patent
UNITED STATES PATENTS

| | | |
|---|---|---|
| 2,567,011 | Diesslin et al. | Sept. 4, 1951 |
| 2,601,536 | La Zerte | June 24, 1952 |
| 2,668,864 | Hals et al. | Feb. 9, 1954 |

OTHER REFERENCES

Boeseken: Rec. Trav. Chim. vol. 46, pp. F41–3 (1927).

Hurd: "Pyrolysis of Carbon Compounds," page 330 (1929).

Simons et al.: J. Am. Chem. Soc., vol. 62, p. 3477 (1940).

McKee: Ind. Eng. Chem. vol. 39, p. 417 (1947).